L. COES.
WRENCH.
No. 186,033.  Patented Jan. 9, 1877.
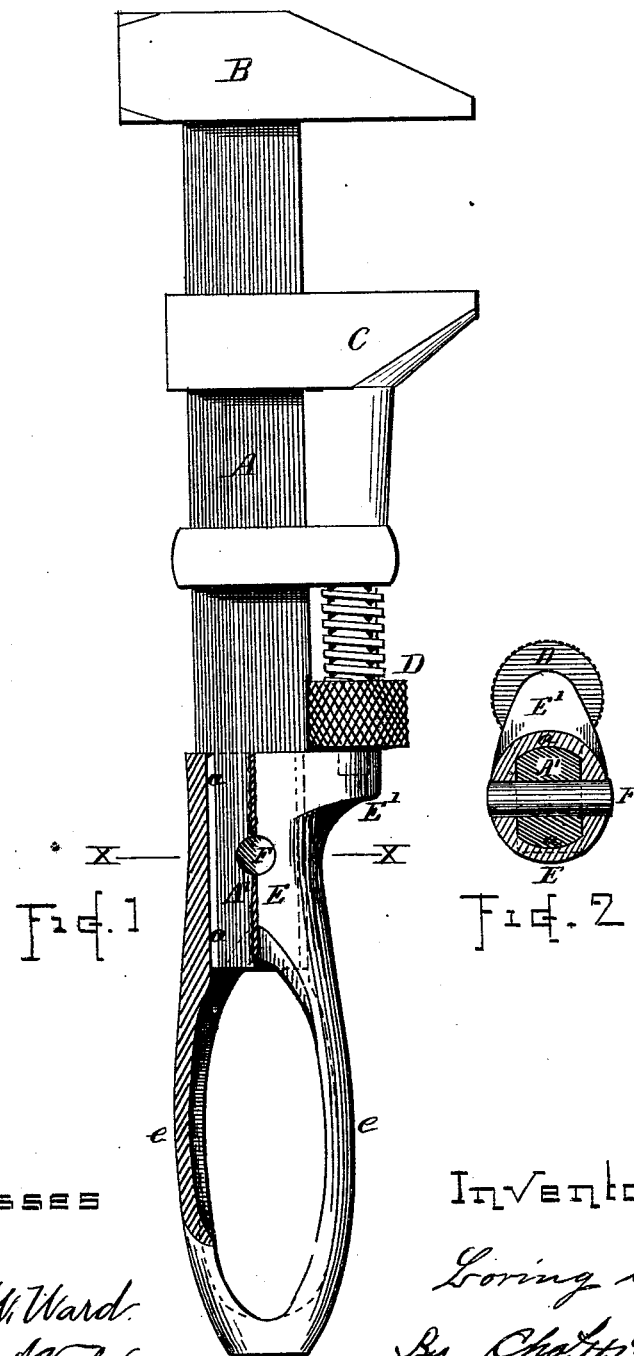
Witnesses
Geo. W. Ward.
Chas. A. Vaile.
Inventor.
Loring Coes.
By Chas. H. Burleigh
Atty.

UNITED STATES PATENT OFFICE.

LORING COES, OF WORCESTER, MASSACHUSETTS.

IMPROVEMENT IN WRENCHES.

Specification forming part of Letters Patent No. 186,033, dated January 9, 1877; application filed November 17, 1876.

*To all whom it may concern:*

Be it known that I, LORING COES, of the city and county of Worcester and State of Massachusetts, have invented certain new and useful Improvements in Screw-Wrenches; and I declare the following to be a description of my said invention sufficiently full, clear, and exact to enable others skilled in the art to which it appertains to make and use the same, reference being had to the accompanying drawings, which form a part of this specification, and in which—

Figure 1 represents a wrench constructed in accordance with my invention, part of the handle being shown in section and part side view. Fig. 2 represents a transverse section of the handle and bar shank at line $xx$, Fig. 1.

This invention relates to that class of wrenches known as the "Coes screw-wrench;" and consists in the peculiar manner of constructing and combining the bar-shank and handle, as hereinafter explained.

In the drawings, A denotes the bar; B, the head-jaw; C, the movable jaw; D, the rosette and screw, and E the handle. Said handle E is cast from metal, having the step projection E' for supporting the rosette-screw D, formed solid with the upper part thereof, while its central part is cored out, leaving the side bars $e\,e$, which are joined at their lower ends, producing an entire metal handle of the form illustrated.

The bar A is first forged or made of a uniform size throughout its length, below the head, and the shank A' is formed by milling or turning off the front and rear corners or edges of the bar for about one and one-half inches (more or less) of its length, as shown at $a\,a$, thus leaving the shank A' of the form shown in section, Fig. 2, with two rounded and two flat sides, and of uniform diameter throughout its length. The opening in the upper portion of the handle E is made to accurately fit and embrace the shank A' throughout its entire length, thus giving a long firm bearing between the parts, while the bar and handle are further secured together by a pin, screw, or rivet, F, passing through the handle E and shank A', in the manner shown.

Among the advantages attained by this manner of construction may be mentioned the following, viz: The great saving of metal and labor in forming the bars A, there being no long tapered shank to forge out; the bar simply requires to be cut off of proper length, and the head B upset thereon.

The handle E being in one piece, with the step E' cast thereon, and being fitted to the bar A by the turned shank A' and long bearing-surfaces $a$, the said parts are retained firm and rigid as though welded together, while the pin F serves to hold the handle against any backward strain from the jaw C, through the screw D, and to transfer such strain to the bar A.

The wrench possesses all requisite strength, and the advantages of a solid handle rigid with the bar, while it is at the same time light and convenient, and can be manufactured with facility and at slight cost.

What I claim as new and of my invention, and desire to secure by Letters Patent, is—

The within-described screw-wrench, consisting of the headed bar A, made with a short smooth shank, A', of uniform diameter, the sliding jaw C, operated by the rosette-screw D at the front of the bar, the handle E, cast from metal, with side ribs $e\,e$, step-projection E' and body in a single piece, and the pin or rivet F, passing through said handle and bar-shank, for securing the parts together and sustaining the backward strain of the jaw C, all as shown and described.

LORING COES.

Witnesses:
 CHAS. H. BURLEIGH,
 S. R. BARTON.